(12) United States Patent
Wilton et al.

(10) Patent No.: US 8,474,586 B2
(45) Date of Patent: Jul. 2, 2013

(54) CLUTCH ACTUATION ASSEMBLY WITH SATELLITE PISTONS

(75) Inventors: Daryl A. Wilton, Macomb, MI (US); James M. Hart, Belleville, MI (US); Hamid Vahabzadeh, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 358 days.

(21) Appl. No.: 12/906,750

(22) Filed: Oct. 18, 2010

(65) Prior Publication Data

US 2012/0090939 A1    Apr. 19, 2012

(51) Int. Cl.
F16D 25/10 (2006.01)
F16D 25/08 (2006.01)
F16H 37/06 (2006.01)

(52) U.S. Cl.
USPC .......... 192/48.607; 192/48.602; 192/48.8; 192/85.51; 192/85.56; 192/85.59; 74/330

(58) Field of Classification Search
USPC ........ 192/48.602, 48.603, 48.606, 48.607, 192/48.609, 85.51, 85.53, 85.56, 85.57, 85.59
See application file for complete search history.

(56) References Cited

U.S. PATENT DOCUMENTS

| | | | |
|---|---|---|---|
| 7,225,696 B2 | 6/2007 | Gitt | |
| 7,240,578 B2 | 7/2007 | Ogami et al. | |
| 7,267,215 B2 * | 9/2007 | Hans | 192/48.602 |
| 7,322,456 B2 * | 1/2008 | Stevenson et al. | 192/48.91 |
| 7,340,973 B2 | 3/2008 | Hiraiwa | |
| 7,367,919 B2 | 5/2008 | Fahland et al. | |
| 7,409,886 B2 | 8/2008 | Gitt | |
| 2005/0115345 A1 | 6/2005 | Gumpoltsberger et al. | |
| 2005/0193848 A1 | 9/2005 | Gitt | |
| 2006/0117882 A1 | 6/2006 | Gitt | |
| 2006/0219033 A1 | 10/2006 | Gitt | |
| 2007/0022835 A1 | 2/2007 | Kilian et al. | |
| 2007/0214906 A1 | 9/2007 | Fahland et al. | |
| 2007/0240530 A1 | 10/2007 | Ogami et al. | |
| 2007/0289399 A1 | 12/2007 | Tanba et al. | |
| 2008/0034905 A1 | 2/2008 | Hatori et al. | |
| 2008/0047378 A1 | 2/2008 | Borgerson et al. | |
| 2008/0047379 A1 | 2/2008 | Borgerson et al. | |
| 2008/0134818 A1 | 6/2008 | Gitt | |
| 2008/0134820 A1 | 6/2008 | Bjorck et al. | |

(Continued)

FOREIGN PATENT DOCUMENTS

DE    102006016059 A1    10/2007
DE    102006016397 A1    10/2007

(Continued)

*Primary Examiner* — Rodney Bonck

(57) ABSTRACT

A dual clutch actuation assembly includes a housing, an annular central piston, a plurality of satellite pistons, and an annular apply member. The housing includes an inner cylindrical wall, an outer cylindrical wall, and a plurality of satellite cylindrical walls. The inner and outer walls define an inner piston annulus and the satellite walls define a plurality of satellite piston bores. Each of the satellite walls is disposed at least partially radially outward of the outer wall. The central piston is disposed in the inner piston annulus and is in sliding engagement with the inner and outer walls of the housing. The satellite pistons are disposed in the satellite piston bores and are in sliding engagement with the satellite walls of the housing. The apply member is axially engaged with each of the satellite pistons and includes an annular plate portion disposed radially outward of the outer cylindrical wall of the housing.

18 Claims, 3 Drawing Sheets

U.S. PATENT DOCUMENTS

| | | |
|---|---|---|
| 2008/0141808 A1 | 6/2008 | Gumpoltsberger |
| 2008/0196526 A1 | 8/2008 | Singh et al. |
| 2008/0202265 A1 | 8/2008 | Hendrickson et al. |
| 2008/0202266 A1 | 8/2008 | Hendrickson et al. |
| 2008/0202267 A1 | 8/2008 | Hendrickson et al. |
| 2008/0202268 A1 | 8/2008 | Carey et al. |
| 2010/0212440 A1* | 8/2010 | Thery ............................ 74/330 |
| 2011/0030506 A1 | 2/2011 | Singh et al. |

FOREIGN PATENT DOCUMENTS

| | | |
|---|---|---|
| WO | WO2005093289 A1 | 10/2005 |
| WO | WO2006106534 A1 | 10/2006 |
| WO | WO2006128626 A1 | 12/2006 |

* cited by examiner

CLUTCH ACTUATION ASSEMBLY WITH SATELLITE PISTONS

TECHNICAL FIELD

The present disclosure relates to clutch actuation assemblies, and more particularly to clutch actuation assemblies with multiple hydraulic pistons.

BACKGROUND

The statements in this section merely provide background information related to the present disclosure and may or may not constitute prior art.

Automatic transmissions provide a plurality of forward and reverse speeds or gear ratios by selectively actuating one or more brakes or clutches. Dual clutch transmissions have two input shafts that each provide a subset of the available gear ratios. Each of the two input shafts is selectively coupled to an engine by use of one of these clutches. A typical dual clutch for engaging the input shafts may have concentric ring shaped pistons for engaging two separate clutches. Each piston generates a force on the clutches that is a function of the pressure of an apply fluid and the area of the piston. One way to increase the applied force on the clutch is to increase the area of the pistons, however when the area of the piston reaches a certain point it may interfere with other components in the transmission. Thus, there is a need for a new and improved clutch actuation assembly that allows increased apply force on clutches for dual input shaft transmissions.

SUMMARY

A hydraulic dual clutch actuation assembly includes a housing, an annular central piston, a plurality of satellite pistons, and an annular apply member. The housing includes an inner cylindrical wall, an outer cylindrical wall concentric with the inner cylindrical wall, and a plurality of satellite cylindrical walls. The inner and outer cylindrical walls define an inner piston annulus and the plurality of satellite cylindrical walls define a plurality of satellite piston bores. Each of the plurality of satellite cylindrical walls is disposed at least partially radially outward of the outer cylindrical wall. The central piston is disposed in the inner piston annulus and is in sliding engagement with the inner and outer cylindrical walls of the housing. The satellite pistons are disposed in the satellite piston bores and are in sliding engagement with the satellite cylindrical walls of the housing. The apply member is axially engaged with each of the plurality of satellite pistons and includes an annular plate portion disposed radially outward of the outer cylindrical wall of the housing.

In another example of the present invention, the dual clutch actuation assembly further includes a bushing disposed between the plate portion of the apply member and the outer cylindrical wall of the housing. The bushing provides a reaction force that is directed to promote a coaxial alignment of the apply member with the outer cylindrical wall of the housing.

In yet another example of the present invention, the satellite cylindrical walls and the inner and outer cylindrical walls of the housing are portions of a single stationary member.

In yet another example of the present invention, the plurality of satellite cylindrical walls are equally spaced about an outer circumference of the outer cylindrical wall of the housing.

In yet another example of the present invention, the plurality of satellite cylindrical walls includes three satellite cylindrical walls spaced 120 degrees apart around the outer circumference of the outer cylindrical wall of the housing.

In yet another example of the present invention, the dual clutch actuation assembly further includes a first fluid passageway in fluid communication between a first and a second of the three satellite cylindrical walls and a second fluid passageway in fluid communication between the second and a third of the three satellite cylindrical walls of the housing.

In yet another example of the present invention, the dual clutch actuation assembly further includes a plurality of fluid passageways in fluid communication between the plurality of satellite cylindrical walls of the housing. The plurality of fluid passageways communicate fluid between each of the satellite cylindrical walls and every other of the satellite cylindrical walls.

In yet another example of the present invention, the apply member includes a plurality of piston engagement portions radially and circumferentially aligned with the plurality of satellite pistons.

Further features, aspects, and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
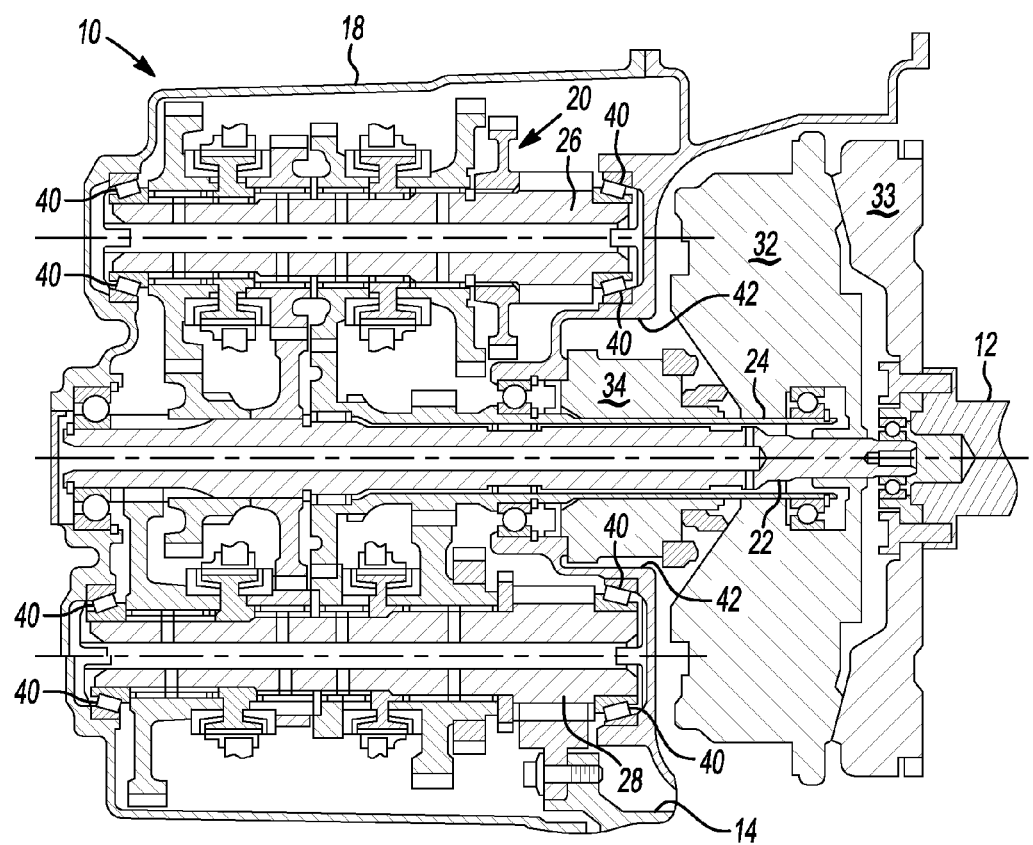
FIG. 1 is a schematic diagram of a vehicle transmission including the clutch actuation assembly according to an embodiment of the present invention.

Referring to the drawings, wherein like reference numbers refer to like components, in FIG. 1 a multiple speed transmission is generally indicated by reference number 10. The transmission 10 is coupled to an engine input member 12 and includes an output member 14. In the present embodiment, the engine input member 12 is an engine crankshaft and the output member 14 is a housing of a differential assembly, however those skilled in the art will appreciate that the input member 12 may be components other than a shaft and the output member 14 may be a component, such as a shaft, other than a housing of a differential assembly.

The engine input member 12 is continuously connected with a prime mover or engine (not shown) or other torque producing machine to provide a driving torque to input member 12. The output member 14 rotatably drives the differential assembly (not shown) and ultimately a pair of road wheels (not shown).

The transmission 10 also includes various shafts or members, co-planar intermeshing gear sets, a dual clutch assembly, and selectively engageable synchronizers to provide a plurality of gear or speed ratios. In the example provided the transmission 10 includes a transmission housing 18, a plurality of gears 20, a first transmission input shaft or member 22, a second transmission input shaft or member 24, a first countershaft 26, a second countershaft 28, a dual clutch assembly 32, a flywheel 33, and a clutch actuation assembly 34. The transmission housing 18 encloses the plurality of gears 20 and the plurality of gears 20 are disposed on the shafts 22, 24, 26, 28 for providing a plurality of speed or gear ratios.

The second transmission input shaft or member 24 is a sleeve (hollow) shaft that is concentric with and overlies the first transmission input shaft or member 22. The first countershaft 26 and the second countershaft 28 are each spaced apart from and parallel with the first and second transmission input shaft members 22, 24. The first and second shafts 22, 24 define a first axis of rotation, the first countershaft 26 defines a second axis of rotation and the second countershaft 28 defines a third axis of rotation.

Figure 3:
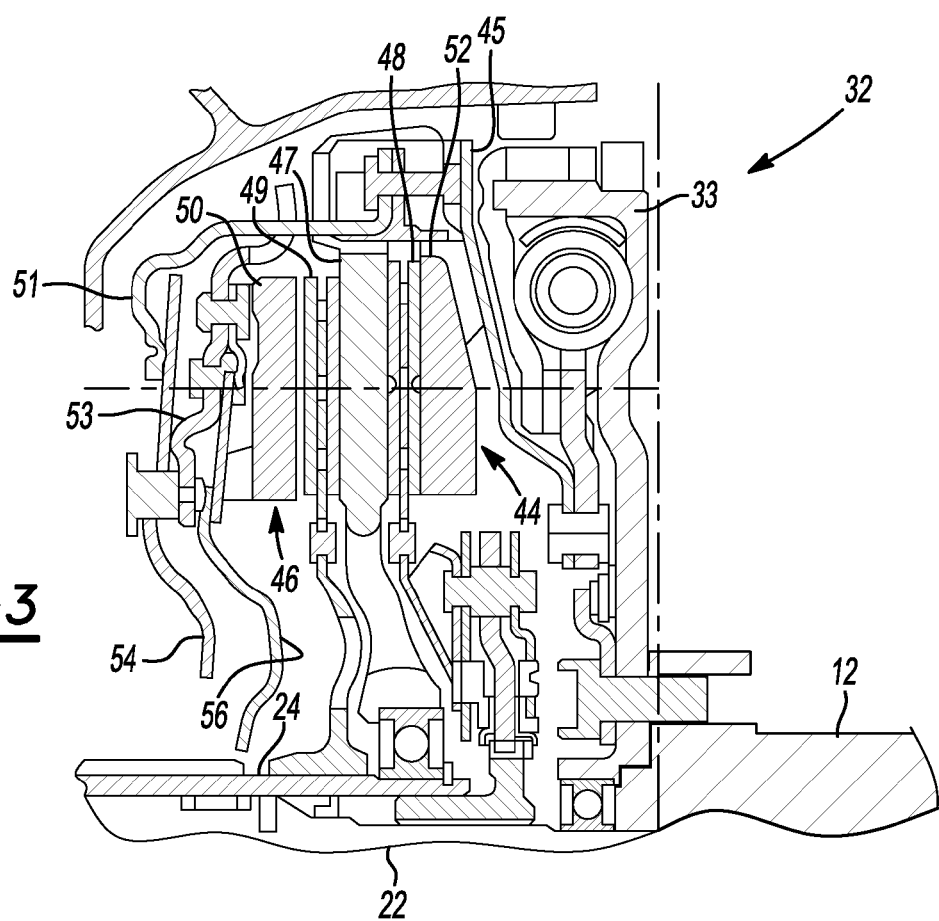
FIG. 3 is a schematic diagram of a portion of a dual clutch assembly in accordance with an embodiment of the present invention.

Referring now to FIG. 3, the dual clutch assembly 32 has a first friction clutch 44 and a separate and independent second friction clutch 46 disposed within a clutch housing or outer hub 45. The clutch housing or outer hub 45 is rotationally fixed to the flywheel 33. The dual clutch assembly 32 includes a friction plate or central hub 47 rotationally connected with the outer hub 45. The central hub 47 is rotatably supported by the sleeve shaft 24 and is axially fixed.

The friction clutches 44, 46 each include friction members 48 and 49, respectively. The friction member 48 is rotatably coupled to the first input shaft 22 and the friction member 49 is rotatably coupled to the second input shaft 24 by spline and groove connections. The friction members 48, 49 are disposed on either side of the axially fixed central hub 47.

The friction clutches 44, 46 also include axially moveable apply members 50, 52, respectively. The apply members 50, 52 are each selectively translatable in an axial direction to engage one of the friction members 48, 49 in order to couple the engine input member 12 with one of the input shafts 22, 24. The apply member 52 is rigidly fixed to an extension member 51 and a pivot portion 53 is rigidly attached to the central hub 47. The apply members 50, 52 are selectively actuated by levers 54, 56. The levers 54, 56 are rotatably coupled with the central hub 47 and axially translatable to selectively compress the apply members 50, 52 and the friction members 48, 49 against the central hub 47.

Figure 2:
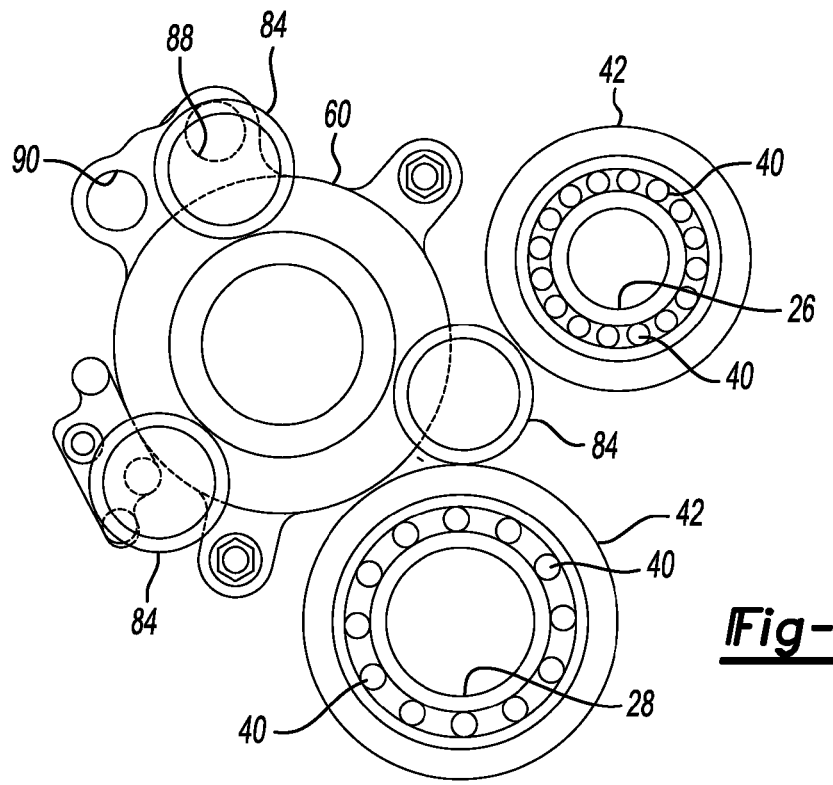
FIG. 2 is a schematic diagram of an end view of a portion of the vehicle transmission of FIG. 1 in accordance with an embodiment of the present invention.
Figure 4:
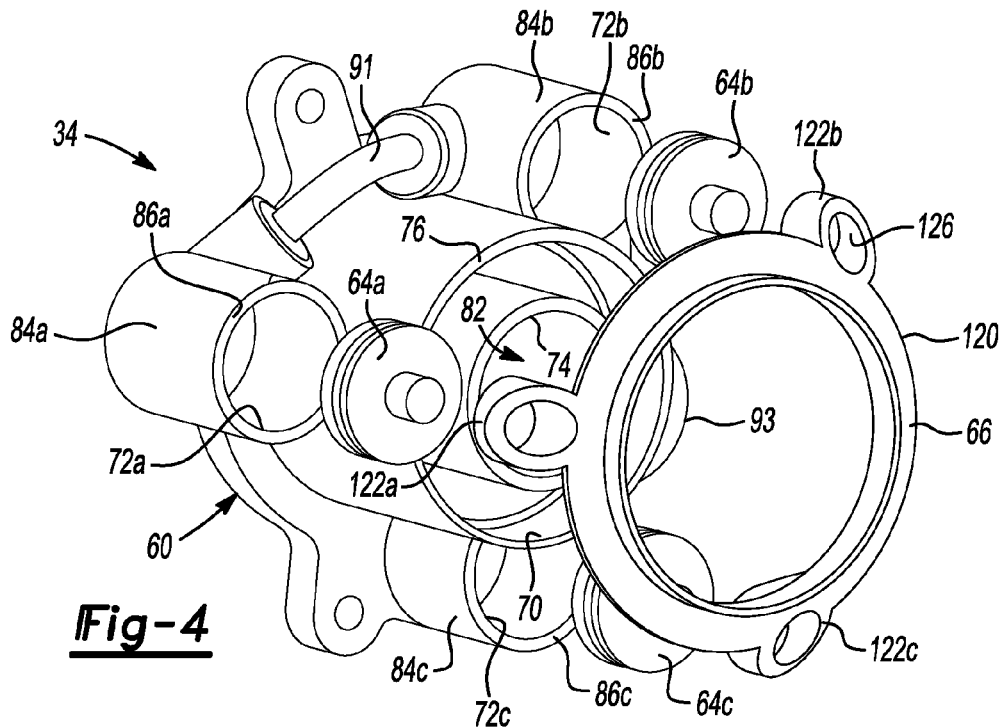
FIG. 4 is an exploded isometric view of a clutch actuation assembly in accordance with an embodiment of the present invention.
Figure 5:
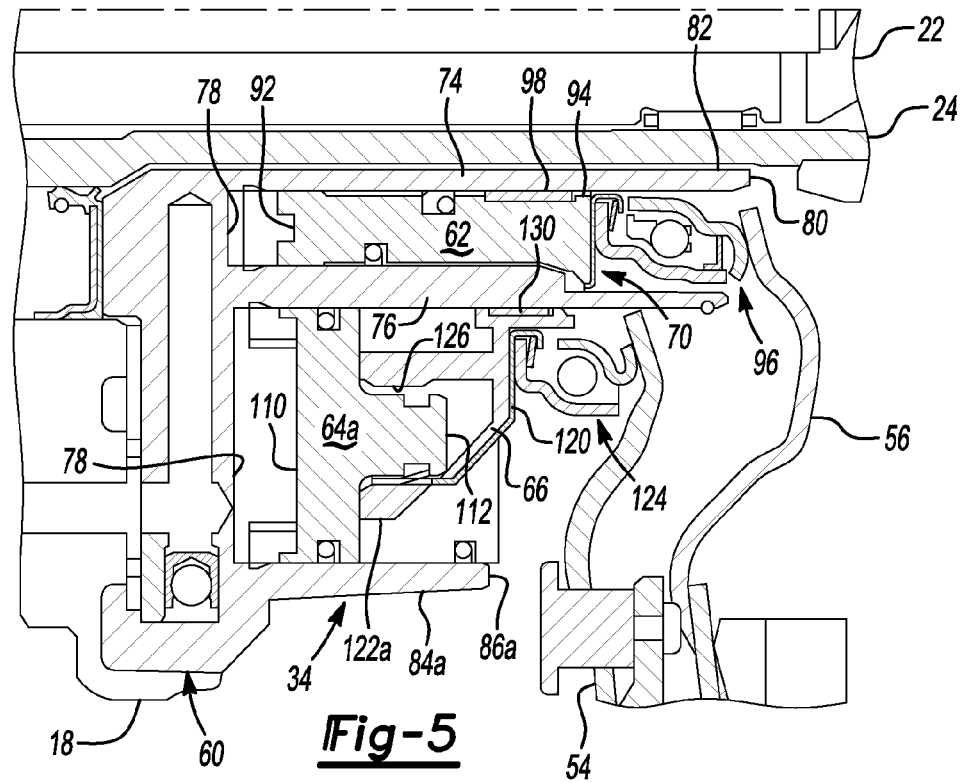
FIG. 5 is a cross-section view of a clutch actuation assembly in accordance with an embodiment of the present invention.

With further reference to FIGS. 2, 4, and 5, and with continued reference to FIG. 1, the clutch actuation assembly 34 includes a housing 60, an annular first or central piston 62, a first satellite piston 64A, a second satellite piston 64B, a third satellite piston 64C, and an annular apply member 66. The housing 60 is connected to and stationary with respect to the transmission housing 18. The housing 60 includes a first or inner piston annulus 70, a first satellite piston bore 72A, a second satellite piston bore 72B, and a third satellite piston bore 72C. The inner piston annulus 70 is defined by an inner cylindrical wall 74, an outer cylindrical wall 76, a base portion 78, and an open end portion 80. The inner wall 74 defines a central bore 82 of the housing 60 for allowing the shafts 22, 24 to project through the dual clutch assembly 32. A distance between the cylindrical walls 74, 76 determines a hydraulic actuation area of the central piston 62 as will be discussed below. In the example provided the hydraulic actuation area is larger than that of a center piston of a concentric slave cylinder module that would fit in the transmission 10.

The satellite piston bores 72A-C are each defined by a respective cylindrical satellite wall 84A-C, the base 78, and a respective open end portion 86A-C. Each satellite wall 84A-C is disposed radially outward of the outer cylindrical wall 76 and is spaced equidistantly around the circumference of the outer wall 76 with respect to each surrounding satellite wall 84. The example provided includes three satellite walls 84A-C spaced 120 degrees apart. It should be appreciated that other numbers of satellite cylinders may incorporated without departing from the scope of the present invention. A distance between the axis of the housing and at least a portion of each satellite wall 84A-C is greater than a minimum distance between the axis of the shafts 22, 24 and the bearing walls 42. In other words, the satellite bores 72A-C are at least partially radially outward of the bearing walls 42 when the clutch actuation assembly 34 is disposed in the transmission 10.

With further reference to FIG. 2 and with continued reference to FIG. 1, the first and second countershafts 26, 28 are rotationally supported in transmission housing 18 by a plurality of thrust or tapered roller bearings 40 disposed in a pair of bearing wall portions 42 of the transmission housing 18. Thrust bearings 40 are disposed at both ends of each of the first and second countershafts 26, 28, as shown in FIG. 1. The thrust bearings 40 are capable of limiting radial and axial movement of the first and second countershafts 26 and 28. The bearing wall portions 42 are annular in shape and coaxial with the respective countershaft 26, 28. The radial location and dimensions of the satellite walls 84A-C are selected so that at least a portion of one of the satellite walls 84A-C may be located directly between the bearing walls 42 when the clutch actuation assembly 34 is assembled in the transmission 10.

A satellite actuation area of the satellite pistons 64A-C is a function of the sum of the areas defined by an inside surface of the satellite walls 84A-C. In the example provided the satellite actuation area is larger than that of an outer piston of a concentric slave cylinder that would fit in the transmission 10. More specifically, the combined hydraulic actuation areas of the pistons 62, 64A-C in the example provided are approximately 30% larger than comparable concentric slave cylinder actuation areas. Therefore, by increasing the hydraulic actuation areas of the piston annulus 70 and the satellite bores 72A-C the actuation force on the actuation members 54, 56 may be increased with use of previously used hydraulic fluid pressures. Alternatively, previously used actuation forces may be achieved with a reduction in hydraulic fluid pressure. It should be appreciated that the increase in hydraulic actuation areas may be distributed in any suitable proportion between the piston annulus 70 and the satellite bores 72A-C.

The actuation assembly 34 is actuated by hydraulic fluid. A first fluid port 88 is in hydraulic communication with the base 78 at the second satellite piston bore 72B and a second fluid port 90 is in hydraulic communication with the base 78 for communication with the inner piston annulus 70. The fluid ports 88, 90 are in fluid communication with a hydraulic control system (not shown) of the transmission 10. The example provided makes use of fluid ports 88, 90 without requiring flexible tubing to route hydraulic fluid flow.

A first fluid transfer tube 91 is in hydraulic communication between the first satellite piston bore 72A and the second satellite piston bore 72B. A second fluid transfer tube 93 is in fluid communication between the second satellite piston bore 72B and the third satellite piston bore 72C. It should be appreciated that the fluid transfer tubes 91, 93 may be disposed inside of the housing 60. The fluid transfer tubes 91, 93 communicate fluid between the satellite bores 72A-C so that a single fluid port 88 may be used to actuate the satellite pistons 64A-C. It should be appreciated that the satellite pistons 64A-C may be actuated using separate fluid ports 88 without departing from the scope of the present invention.

The central piston 62 is disposed in the inner piston annulus 70 and includes a hydraulic actuation surface 92 and an engagement portion 94. The actuation surface 92 opposes the base 78 of the inner piston annulus 70 and combines with a hydraulic fluid pressure to determine an actuation force of the central piston 62. The engagement portion 94 is opposite the actuation surface 92 proximate the open end portion 80 of the inner piston annulus 70. The engagement portion 94 is axially engaged with the lever 56 of the second clutch 46. In the example provided, the engagement portion 94 is axially engaged with the lever 56 by a bearing assembly 96. A central bushing 98 is disposed between the central piston 62 and an outer surface of the inner cylindrical wall 74 to guide or pilot the piston and promote coaxial alignment of the central piston 62 with the housing 60.

The satellite pistons 64A-C are generally cylindrical in shape and are each disposed in the respective satellite piston bore 72A-C. The satellite pistons 64A-C each includes an actuation surface 110 and an engagement portion 112. The actuation surface 110 opposes the base 78 of the respective satellite piston bore 72A-C and combines with a hydraulic fluid pressure to determine an actuation force of each satellite piston 64A-C. The engagement portion 112 is opposite the actuation surface 110 proximate the open end portion 86A-C of the respective satellite piston bore 72A-C.

The apply member 66 is disposed axially adjacent to the engagement portion 112 of each of the satellite pistons 64A-C and includes a plate portion 120 and three engagement portions 122A, 122B, 122C. The plate portion 120 is generally annular in shape and is coaxial with the outer cylindrical wall 76. The plate portion 120 is axially engaged with the lever 54 of the first clutch 44 and is slidably received on the outer wall 76. In the example provided, the plate portion 120 is axially engaged with the lever 54 by a bearing assembly 124. The engagement portions 122A-C correspond to and are engaged with the engagement portion 112 of each respective satellite piston 64A-C. The engagement portions 122A-C extend axially towards the base 78 of the housing 60 away from the plate portion 120. In the example provided, the engagement portions 122A-C each define a bore 126 that receives a projection on the engagement portion 112 of the respective satellite piston 64A-C.

A bushing 130 is disposed between an inner surface of the apply member 66 and an outer surface of the outer cylindrical wall 76. The bushing 130 guides the apply member 66 during axial motion and promotes a coaxial alignment of the apply member 66 and with the outer wall 76 of the housing 60 if the satellite pistons 64A-C apply force on the apply member 66 in different amounts.

Referring now to FIGS. 1-5, the operation of the clutch actuation assembly 34 will now be described. The first clutch 44 is actuated to transfer torque between the member 12 and the first input shaft 22. A hydraulic fluid enters the hydraulic fluid port 88 to the satellite piston bore 72B. The hydraulic fluid enters the satellite piston bores 72A, 72C through the fluid transfer tubes 91, 93. The hydraulic fluid exerts a force on the actuation surface 110 of the satellite pistons 64A-C, pushing the pistons away from the base 78 of the satellite piston bores 72A-C. The engagement portion 112 of each satellite piston 64A-C pushes the respective engagement portion 122A-C, which pushes the plate portion 120 of the apply member 66 toward the first clutch 44. As apply member 66 translates towards the first clutch 44, the bushing 130 resists skewing of the plate portion 120 of the apply member 66 and promotes a coaxial alignment of the apply member 66 and the outer cylindrical wall 76. The plate portion 120 of the apply member 66 pushes the lever 54 of the first clutch 44 through the bearing assembly 124. The lever 54 pivots on the pivot point 53 of the outer hub 45 thereby pulling on the apply member 52 which applies a load on the friction member 48. The extension member 51 pulls the apply member 52 and the friction member 48 of the first clutch 44 against the central hub 47. Torque is then transmitted from the input member 12 to the flywheel 33, from the flywheel 33 to the outer hub 45, from the outer hub 45 to the central hub 47, from the central hub 47 to the friction member 48, and from the friction member 48 to the first shaft 22.

The second clutch 46 is actuated to transfer torque between the member 12 and the second input shaft 24. A hydraulic fluid enters the hydraulic fluid port 90 to the piston annulus 70. The hydraulic fluid exerts a force on the actuation surface 92 of the central piston 62, pushing the piston 62 away from the base 78 of the piston annulus 70. The engagement portion 94 of the central piston 62 pushes the lever 56 of the second clutch 46 through the bearing assembly 96. The lever 56 presses the apply member 50 and the friction member 49 of the second clutch 46 against the central hub 47. Torque is then transmitted from the input member 12 to the flywheel 33, from the flywheel 33 to the outer hub 45, from the outer hub 45 to the central hub 47, from the central hub 47 to the friction member 49, and from the friction member 49 to the second shaft 24.

The present invention provides several beneficial attributes. For example, actuation force by the pistons on the clutches may be increased while maintaining previous hydraulic fluid pressures. Alternatively, the actuation force by the pistons on the clutches may be maintained while reducing the hydraulic fluid pressure requirement. Additionally, the present invention allows a simple installation of a single housing while maintaining actuation capabilities on two separate clutches. The actuation performance of the satellite pistons has desirable characteristics including the alignment characteristics of the apply plate due to inclusion of a bushing.

The description of the invention is merely exemplary in nature and variations that do not depart from the general essence of the invention are intended to be within the scope of the invention. Such variations are not to be regarded as a departure from the spirit and scope of the invention.

We claim the following

1. A hydraulic dual clutch actuation assembly comprising:
    a housing including an inner cylindrical wall, an outer cylindrical wall concentric with the inner cylindrical wall, and a plurality of satellite cylindrical walls, the inner and outer cylindrical walls defining an inner piston annulus and the plurality of satellite cylindrical walls defining a plurality of satellite piston bores, and wherein each of the plurality of satellite cylindrical walls is disposed at least partially radially outward of the outer cylindrical wall;
    an annular central piston disposed in the inner piston annulus and in sliding engagement with the inner and outer cylindrical walls of the housing;
    a plurality of satellite pistons disposed in the satellite piston bores and in sliding engagement with the satellite cylindrical walls of the housing; and
    an annular apply member axially engaged with each of the plurality of satellite pistons and including an annular plate portion disposed radially outward of the outer cylindrical wall of the housing.

2. The dual clutch actuation assembly of claim 1 further including a bushing disposed between the plate portion of the apply member and the outer cylindrical wall of the housing, wherein the bushing provides a reaction force to guide the apply member and to promote a coaxial alignment of the apply member with the outer cylindrical wall of the housing.

3. The dual clutch actuation assembly of claim 1 wherein the satellite cylindrical walls and the inner and outer cylindrical walls of the housing are portions of a single stationary member.

4. The dual clutch actuation assembly of claim 1 wherein the plurality of satellite cylindrical walls are equally spaced about an outer circumference of the outer cylindrical wall of the housing.

5. The dual clutch actuation assembly of claim 4 wherein the plurality of satellite cylindrical walls include three satellite cylindrical walls spaced 120 degrees apart around the outer circumference of the outer cylindrical wall of the housing.

6. The dual clutch actuation assembly of claim 5 further including a first fluid passageway in fluid communication between a first and a second of the three satellite cylindrical walls and a second fluid passageway in fluid communication between the second and a third of the three satellite cylindrical walls of the housing.

7. The dual clutch actuation assembly of claim 1 further including a plurality of fluid passageways in fluid communication between the plurality of satellite cylindrical walls of the housing, wherein the plurality of fluid passageways communicate fluid between each of the satellite piston bores and every other of the satellite piston bores.

8. The dual clutch actuation assembly of claim 1 wherein the apply member includes a plurality of piston engagement portions radially and circumferentially aligned with the plurality of satellite pistons.

9. A dual clutch transmission for transmitting torque between a prime mover and an output shaft, the dual clutch transmission comprising:
a transmission housing including a first bearing portion and a second bearing portion for supporting a first and a second countershaft;
a first input shaft;
a second input shaft;
a first clutch including an actuation member and selectively engaged between the prime mover and the first input shaft;
a second clutch including an actuation member and selectively engaged between the prime mover and the second input shaft;
an actuator housing including an inner cylindrical wall, an outer cylindrical wall concentric with the inner cylindrical wall, and a plurality of satellite cylindrical walls, the inner cylindrical wall circumscribing the first and the second input shafts, the inner and outer cylindrical walls defining an inner piston annulus, and the plurality of satellite cylindrical walls defining a plurality of satellite piston bores, and wherein each of the plurality of satellite cylindrical walls is disposed at least partially radially outward of the outer cylindrical wall of the housing;
a plurality of satellite pistons disposed in the satellite piston bores and in sliding engagement with the satellite cylindrical walls of the housing;
an annular apply member axially engaged with each of the plurality of satellite pistons and including an annular plate portion disposed radially outward of the outer cylindrical wall of the housing, wherein the apply member is disposed for axial engagement with the actuation member of the first clutch; and
an annular central piston disposed in the inner piston annulus and in sliding engagement with the inner and outer cylindrical walls of the housing, wherein the central piston is disposed for axial engagement with the actuation member of the second clutch.

10. The dual clutch actuation assembly of claim 9 further including a bushing disposed between the plate portion of the apply member and the outer cylindrical wall of the housing, wherein the bushing provides a reaction force to guide the apply member and to promote a coaxial alignment of the apply member with the outer cylindrical wall of the housing.

11. The dual clutch transmission of claim 9 wherein the actuator housing is fixed to the transmission housing.

12. The dual clutch actuation assembly of claim 9 wherein the plurality of satellite cylindrical walls are equally spaced about an outer circumference of the outer cylindrical wall of the housing.

13. The dual clutch actuation assembly of claim 12 wherein the plurality of satellite cylindrical walls include three satellite cylindrical walls spaced 120 degrees apart around the outer circumference of the outer cylindrical wall of the housing.

14. The dual clutch transmission of claim 13 further including a first fluid passageway in fluid communication between a first and a second of the three satellite cylindrical walls and a second fluid passageway in fluid communication between the second and a third of the three satellite cylindrical walls of the actuator housing.

15. The dual clutch actuation assembly of claim 13 further including a first fluid passageway in fluid communication between a first and a second of the three satellite cylindrical walls and a second fluid passageway in fluid communication between the second and a third of the three satellite cylindrical walls of the housing.

16. The dual clutch actuation assembly of claim 9 wherein the apply member includes a plurality of piston engagement portions radially and circumferentially aligned with the plurality of satellite pistons.

17. The dual clutch transmission of claim 9 wherein an axis of a first of the satellite cylindrical walls is disposed directly between the first bearing portion and the second bearing portion of the transmission housing.

18. The dual clutch transmission of claim 9 wherein the dual clutch transmission has a combined hydraulic actuation area that is determined by the distance between the inner cylindrical wall and the outer cylindrical wall, along with the sum of the areas defined by an inside surface of each of the satellite cylindrical walls.

* * * * *